United States Patent
Sankaran et al.

(10) Patent No.: US 9,930,424 B2
(45) Date of Patent: Mar. 27, 2018

(54) PROXY CHANNELS FOR VIEWING AUDIENCES

(71) Applicant: YuMe, Inc., Redwood City, CA (US)

(72) Inventors: Ayyappan Sankaran, San Jose, CA (US); Jayant Kadambi, Palo Alto, CA (US); Halim Damerdji, Los Altos, CA (US)

(73) Assignee: YuMe, Inc., Redwood City, CA (US)

( * ) Notice: Subject to any disclaimer, the term of this patent is extended or adjusted under 35 U.S.C. 154(b) by 0 days.

(21) Appl. No.: 13/831,524

(22) Filed: Mar. 14, 2013

(65) Prior Publication Data

US 2014/0282710 A1 Sep. 18, 2014

(51) Int. Cl.
| | |
|---|---|
| H04N 7/10 | (2006.01) |
| H04N 7/025 | (2006.01) |
| H04N 21/81 | (2011.01) |
| G06Q 30/02 | (2012.01) |

(52) U.S. Cl.
CPC ....... *H04N 21/812* (2013.01); *G06Q 30/0203* (2013.01); *G06Q 30/0251* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,046,797 | B2 * | 10/2011 | Bentolila | G06Q 30/0251 705/14.49 |
| 8,073,013 | B2 * | 12/2011 | Coleman | G06Q 30/02 370/486 |
| 8,495,680 | B2 * | 7/2013 | Bentolila | G06Q 30/0251 725/14 |
| 2005/0283792 | A1 * | 12/2005 | Swix | H04H 20/78 725/9 |
| 2007/0261088 | A1 * | 11/2007 | Phillips | G06Q 30/02 725/97 |
| 2008/0313010 | A1 * | 12/2008 | Jepson | G06Q 30/02 705/7.32 |
| 2009/0018893 | A1 * | 1/2009 | Aviv | G06Q 30/02 705/7.32 |
| 2009/0183217 | A1 * | 7/2009 | Mukerji | H04N 7/17318 725/110 |
| 2012/0110620 | A1 * | 5/2012 | Kilar et al. | 725/34 |
| 2013/0124309 | A1 * | 5/2013 | Traasdahl | H04L 67/22 705/14.49 |
| 2014/0032657 | A1 * | 1/2014 | Johnmar | H04L 67/22 709/204 |

* cited by examiner

*Primary Examiner* — Alexander Gee
(74) *Attorney, Agent, or Firm* — TIPS Group (57) ABSTRACT

A system and method leverage survey data to segment viewers to associate the viewers to television programs. The viewer associations resulting from classification are advantageously employed by advertisers to increase the penetration of the advertising to the consuming public, cost effectiveness of the advertising, brand acceptance, and the like, by targeting the classified viewers through the associated content provider websites.

20 Claims, 8 Drawing Sheets

| | |
|---|---|
| Core (prefix) | What is your age? |
| Core (prefix) | Are you...? (Male/Female) |
| Core (prefix) | What country do you live in? |
| ... | ... |
| Core (postfix) | What is your primary job function? |
| Core (postfix) | What was your pre-tax household income last year? |
| Core (postfix) | What suggestions for improvement, if any do you have regarding your website visit today? |
| ... | |
| genre-specific content | *American Idol?* Like/Dislike<br><br>*The Voice?* Like/Dislike |
| genre-inclusive content | ...<br><br>*Americas's Got Talent?* Like/Dislike |
| genre-related content | ...<br><br>*Dancing With The Stars?* Like/Dislike |

PROXY CHANNELS FOR VIEWING AUDIENCES

BACKGROUND

In the past and continuing into the present, television, radio, and printed publications, such as newspapers and magazines, have dominated the delivery of news, sports, and entertainment content to the public. Consequently, advertisers have typically budgeted a substantial portion of their advertising resources to advertising in these media. As used herein, the term "advertiser" includes an advertiser or an agency representing the advertiser.

By way of a non-limiting example, if a television advertiser wants to launch an advertising campaign or place an advertisement, the advertiser typically bases the decision about advertising placement on marketing data. Included in the marketing data is information that enables the advertiser to assess whether to advertise during television programs which include specific content of interest to a projected audience of viewers who are expected to be most receptive to the advertising according to that marketing information.

For example, if the advertiser possesses marketing information that indicates its advertising is expected to be most successful when viewed during a television program featuring a musical competition, the advertiser will likely seek to place advertising to be viewed during that television program and perhaps other similar television programs, i.e., content-specific television programs relating to musical competitions, such as American Idol, The Voice, etc. In that way, the advertiser can expect to reach a collective audience which is most likely to be receptive to the advertising. Stated differently, the audience of interest to the advertiser is targeted through content-specific television programs, such that the content is a "proxy" to reach that audience, and each program is a content-specific "proxy channel" to target a segment of the collective audience. Therefore, the advertising through which goods or services are being marketed is targeted at a collective viewing audience based on content-specific television programs (e.g., programs of the musical competition genre) as a proxy to reach that collective audience.

In the present example, once the content-specific television program or genre is identified, the advertiser must contract with the publisher(s) of the television program(s) whose content is a proxy for the audience that the advertiser wants to target, which will be effective against the advertisement or advertising campaign the advertiser is trying to run. However, in today's television industry, for example, the advertiser must then negotiate with each content publisher to place the advertising. Such negotiations typically require a significant number of personnel and budgeted advertising resources to contract with the content publishers, such as Fox Broadcasting Company for American Idol, NBC for The Voice, etc., to target the collective audience, because the advertiser is using content as a proxy. That is, in order to assure the targeted audience is reached, the advertiser typically spreads budgeted advertising resources across at least several of the television programs whose content is used as a proxy by entering into advertisement placement contracts with multiple content publishers.

With the advent of Internet connectivity and the World Wide Web, the delivery of information and entertainment content has begun to increasingly shift to publication over the Internet. Currently, services such as CNBC deliver news content, services such as ESPN deliver sports content, and services such as Netflix and Hulu deliver entertainment content including movies and television programs over the Internet. Many of these services are dependent on an advertising revenue model, such that advertisers also place paid advertisements that accompany the information or entertainment content delivered over the Internet in addition to, or in some instances as an alternative to, traditional television, radio, and print advertising. Furthermore, other Internet enabled services, such as email services and other informational services, include advertisements to obtain revenue.

Accordingly, one particularly explosive area of growth in the field of advertising and, in particular, video advertising, is over the Internet. Video advertising over the Internet is currently supported by many hardware platforms, sometimes referred to herein as "client" or "user" devices. For example, video advertising can be displayed in web browsers of computers. Video advertising is also increasingly being displayed on mobile devices such as smartphones and tablet computers within apps. With such advertising, the video advertising is typically "streamed" from a server to the client device over a network, such as the Internet, a wireless telephone network, a private network, etc.

Due to the growing acceptance of delivery of information and entertainment content via the Internet, advertisers who want to reach a certain audience can reach that audience online, instead of through conventional television advertising, because the targeted audience can be targeted by online advertising and online advertising is typically less expensive than conventional television advertising.

Importantly, the World Wide Web is generally conducive to implementing surveys, associating them with advertisements contemporaneously delivered via the Internet, and collecting responses as survey data quickly and inexpensively. For example, commonly assigned co-pending U.S. patent application Ser. No. 12/455,314 filed on May 28, 2009, entitled SYSTEM AND METHOD FOR AUTOMATED ONLINE SURVEY, which is hereby incorporated herein in its entirety by this reference, relates to surveying specific characteristics of a website viewer population, such as demographic and psychographic statistics, which aids website owners and advertisers in optimizing advertising.

While these surveys have been used to evaluate the impressions of a viewing audience to the advertising, advertisers typically continue to embrace the paradigm of relying on marketing data to decide how to spend budgeted advertising resources as between conventional television, radio, and/or print advertising vis-à-vis online advertising. Furthermore, the marketing data continues the traditional approach of using content as a proxy to target the collective audience of consumers for the products and services that are advertised. That is, the paradigm continues to be content-centric. As a consequence of the existing paradigm, advertisers continue to spread their advertising across many televisions and have limited the audience that may be receptive to advertising delivered over the Internet.

These and other limitations of the prior art will become apparent to persons skilled in the art upon a reading of the following descriptions and a study of the several figures of the drawing.

SUMMARY

In contrast to the paradigm of the prior art, the example embodiments of the present invention provide proxy channels based on identifiable audiences rather than being content-centric. A system and method in accordance with example embodiments leverage survey data to identify one or more audience-based proxy channels. Embodiments disclosed herein are related to surveys, censuses, and the like, and schema for conducting the same, including the use of online questionnaires to determine association of viewers comprising a potential audience to content, rather than vice versa according to the prevailing paradigm.

Certain embodiments, set forth by way of example and not limitation, relate to surveying persons viewing media, including published content accessed at a website and streamed or downloaded to a client device for display or one or more pages published at the website to elicit their preferences. Favorable preferences associated to the published content, such as video entertainment (e.g., a movie), news, sports, or other informational content, can be a subject of the surveys.

Accordingly, example embodiments of systems and methods are described for conducting surveys or censuses, including schema for conducting online surveys and censuses, of persons whose responses are solicited to provide information regarding their preferences respecting published content to a survey or census sponsor. For example, persons viewing media, such as one or more pages at a website or streaming or downloaded media accessed at a website, are surveyed to elicit preferences respecting the published content. Preferences associated to the published content, such as content-specific video entertainment (e.g., a music competition television program), news, sports, or other information content, as well as other published content defining a genre, delivered over a network, such as the Internet, may be example subjects of the surveys.

In an embodiment, set forth by way of example and not limitation, a method for a survey may be associated to the content that is delivered via the Internet. At a predetermined time, typically before the delivery of the published content, a survey is delivered to the viewer/survey respondent over the same network as the published content.

In an embodiment, set forth by way of example and not limitation, a non-transitory computer readable media containing program instructions including one or more code segments executable on one or more computer processors includes code segments for displaying a survey including one or more questions on display devices of one or more viewers, code segments for receiving the responses to the survey questions, code segments for aggregating preferences of viewers based on responses to the one or more survey questions, and code segments for clustering viewers based on their responses to aggregate the clustered viewers as one or more viewing audience proxy channels based on their surveyed preferences.

In an embodiment, set forth by way of example and not limitation, a server includes a processor, a network connection coupled to the processor, and non-volatile memory coupled to the processor containing program instructions comprising code segments to conduct a survey including one or more questions on display devices of one or more viewers, code segments for receiving the responses to the survey questions, code segments for aggregating preferences of viewers based on responses to the one or more survey questions, and code segments for clustering viewers based on their responses to aggregate the clustered viewers as one or more viewing audience proxy channels based on their surveyed preferences. In this example embodiment, the program instructions include code segments for launching a survey via the network connection, code segments for receiving responses to the survey questions via the network connection, and code segments to cluster viewers based on their responses to aggregate the clustered viewers as one or more viewing audience proxy channels based on their surveyed preferences.

An example embodiment, set forth by way of example and not limitation, provides a system to cluster viewers based on their responses to survey questions to aggregate the clustered viewers as one or more viewing audience proxy channels based on their surveyed preferences comprising a sampling engine including instructions comprising code segments executable by a computer system to conduct a survey including one or more questions provided to the plurality of viewers of media accessible by the plurality of viewers, a survey engine including instructions comprising code segments executable by the computer system to receive survey data including responses by viewers responding to the survey, a data store including instructions comprising code segments executable by the computer system to store the survey response data in a computer-readable storage medium, and an analytics engine including instructions comprising code segments executable by the computer system after the survey is completed to analyze the survey response data to determine preferences of the viewers from the survey response data and to analyze the preferences among responding viewers to cluster viewers based on their responses to aggregate the clustered viewers as one or more viewing audience proxy channels based on their surveyed preferences.

Another example embodiment provides a method for clustering of viewers based on their responses to survey questions to aggregate the clustered viewers as one or more viewing audience proxy channels based on their surveyed preferences, including conducting a survey including one or more questions provided to the plurality of viewers of media accessible by the plurality of viewers, receiving survey data including responses by viewers responding to the survey, storing the survey response data in a computer-readable storage medium, and analyzing the survey response data to determine preferences of the viewers from the survey response data and to analyze the preferences among responding viewers to cluster viewers based on their responses to aggregate the clustered viewers as one or more viewing audience proxy channels based on their surveyed preferences.

By leveraging survey data to identify one or more audience-based proxy channels, advertisers may more effectively allocate their online advertising budgets and access additional segments of a collective audience to be successfully targeted by an advertisement or advertising campaign. Such audience based proxy channels may be advantageously employed by advertisers to increase the penetration of the advertising to the consuming public, cost effectiveness of the advertising, brand acceptance, and the like. The proxy channels for audiences allow an advertiser to place advertising to better promote a product or service and enable the advertiser to increase the probability of success of an advertising campaign and the cost effectiveness of the campaign to fundamentally change the way advertisers conduct online surveys to adjust their advertising strategy compared to the existing content-centric paradigm.

The above and other example embodiments, features, and advantages will become apparent to persons skilled in the art upon a reading of the following descriptions and a study of the several figures of the drawing.

BRIEF DESCRIPTION OF THE DRAWINGS

Several example embodiments will now be described with reference to the drawing figures, wherein like components are provided with like reference numerals. The example embodiments are intended to illustrate, but not to limit, the invention. The drawing includes the following figures.

DETAILED DESCRIPTION OF EXAMPLE EMBODIMENTS

Figure 1:
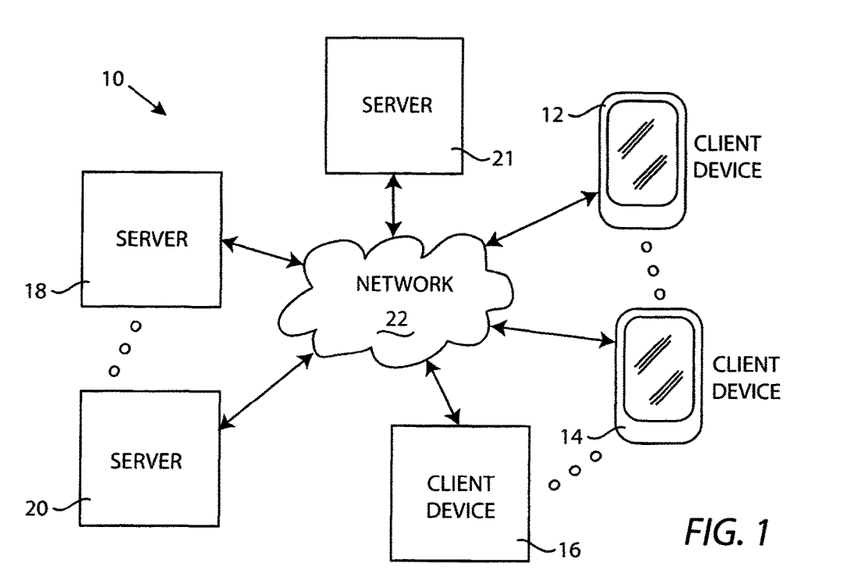
FIG. 1 is a block diagram of an example system which can be used in some implementations of one or more features described herein.

FIG. 1 is a block diagram of an example system 10 which can be used in some implementations of one or more features described herein. In this example, the system 10 includes one or more user or client devices, such as a smartphone 12, a tablet computer 14, and a computer 16, one or more video servers, such as an ad server 18, a publisher content server 20, and a survey server 21, and a network 22. As used herein, the words "user" and "client" may be used synonymously.

Client devices 12, 14, and 16 can be any devices that are operated by users and coupled to the network 22 by a communication link, such as a wireless or wired link. A client device can perform a variety of functions, including performing communications with other devices and running applications on the device that receive input from the user and provide output to the user. In some examples, the user input can be in various forms including contacting a touchscreen on the device, manipulating an input pointing device (e.g., mouse, trackball, touchpad, joystick, etc.), pressing physical keys or physical buttons (e.g., keyboard, buttons, etc.), providing voice or sound input to a microphone, causing motion of the device, etc. Any of a variety of devices can be used as client devices in addition to the non-limiting examples of the smartphone 12, tablet computer 14, and computer 16 including, but not limited to, personal digital assistants (PDAs), game devices, televisions, telephones, media players, home appliances and devices, etc., which may be coupled to the network 22.

Typically, an advertisement appears on a web page or is delivered in conjunction with other content such as news, sports, or entertainment or other web-based service, such as an email. By way of non-limiting example, the advertisement may be delivered as an image or video without audio or combined with audio content. Video servers, such as the ad server 18 and publisher content server 20, provide streaming video to client devices 12, 14, and/or 16 over the network 22, in this non-limiting example. The ad server 18 can be provided by an advertiser or an ad network, and a publisher content server 20 can be provided by a number of sources including YouTube® of Mountain View, Calif. The ad server 18 can, for example, provide an "in-stream ad" which may be a short video advertisement (e.g., 15-30 seconds in duration) for a product or service, played before ("pre-roll"), during ("mid-roll"), or after ("post-roll") streaming video content that a user has requested from the publisher content server 20. If the advertisement is delivered during the non-advertising content, the advertisement may be delivered during an interruption in the non-advertising content or simultaneously with the non-advertising content. If the advertisement is delivered simultaneously with the non-advertising content, the advertisement may be delivered as an image or video streamed as an overlay on the non-advertising content. In other examples, more or fewer servers may be used to provide publisher content and advertising. The survey server 21 may be a separate server or combined with either the ad server 18 or publisher content server 20.

One or more networks 22 are used to provide communication channels for the various devices of the system 10. The network 22 may be any type of communication network, such as the Internet, local area networks (LANs), cell phone networks, or other networks, such as the Internet-enabled television network. Some implementations may provide features described herein on devices that are intermittently coupled to the network 22. A number of network communication protocols are suitable for the communication between the client devices and the servers 18, 21, and 22 of the system 10.

Figure 2:
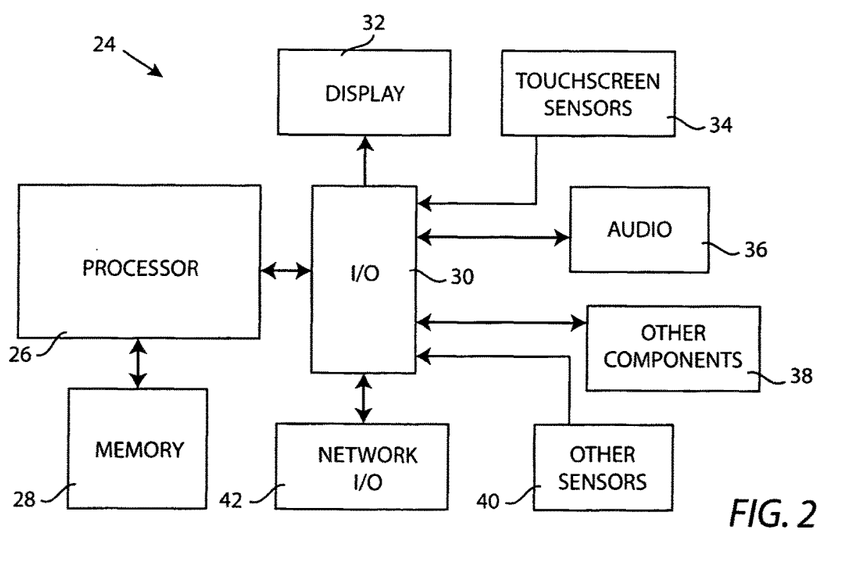
FIG. 2 is a block diagram illustrating an example mobile client device suitable for use with features described herein.

FIG. 2 is a block diagram illustrating an example client device 24 suitable for use with features described herein. For example, the client device 24 can be used to implement mobile client devices, such as the smartphone 12 and tablet computer 14 shown in FIG. 1. In some implementations, a server system such as the ad server 18, publisher content server 20, or survey server 21 shown in FIG. 1 can include some or all of the components shown for the example client device 24.

As shown in FIG. 2, a processor 26 can be included in the client device 24 to control operation of the device. The processor 26 can be one or more of any type of processor or processing circuitry, such as microprocessors, ASICs, FPGAs, logic gates, etc., or any combination thereof. The processor 26 can access memory 28 which may store a variety of program instructions comprising one or more code segments and data for use and output by the processor, including applications, operating system data, data received from other devices over a network, etc. In some implementations, memory 28 can be embedded in the processor 26 and/or can be provided separately and coupled to the processor in the client device 24, as shown in FIG. 2. Any of a variety of different types of memory can be used, such as RAM, ROM, flash memory, EEPROM, etc., or any combination thereof. Some memory 28 can be "volatile" (e.g., its memory state is lost when power is removed), while other memory 28 can be "nonvolatile" (e.g., its memory state is retained when power is removed). All forms of memory 28 are considered to be "non-transitory", as set forth in a memorandum entitled "*Subject Matter Eligibility of Computer Readable Media*" by David J. Kappos, Under Secretary of Commerce for Intellectual Property and Director of the United States Patent and Trademark Office dated Jan. 26, 2010, in that memory 28 does not store data in a transitory propagating signal.

I/O circuitry 30 can be coupled to the processor 26 to interface the processor with a variety of different input components and output components for use with the client device 24. For example, a display 32, such as a display screen or other display device, can output visual images, text, etc., produced by processor 26 and/or other components 38 of the client device 24. Touchscreen sensors 34 may be included on some types of the client device 24 to allow contact on or over the display 32 by a user or object to be sensed, and the position of the contact communicated to the processor 26. Audio devices 36 may be included, such as one or more speakers, used to output sounds, such as music, and one or more microphones to receive voice input and other audio input and communicate the audio input to the processor 26.

Various other types of sensors 40 may be coupled to the client device 24 and used to sense different characteristics, such as accelerometers and/or gyroscopes to sense motion of the client device (e.g., tilting, rotation, or other spatial movement), optical sensors to sense contact by the user or other objects in relation to the client device, magnetic sensors, or other types of sensors. Network I/O 42 may include one or more components for enabling communication of information between the client device 24 and other devices over a network, such as the network 22 shown in FIG. 1. For example, wireless communication components can use radio frequency (RF), infrared (IR), or other wireless frequencies to communicate information in signals to and from wireless networks. Standard protocols, such as cell phone protocols and/or WiFi, may be used in some implementations. Other input and output components may also be included or coupled to the client device 24, such as components allowing various devices or networks to be connected via a wired connection to the client device, including Ethernet or other network components.

Figure 3:
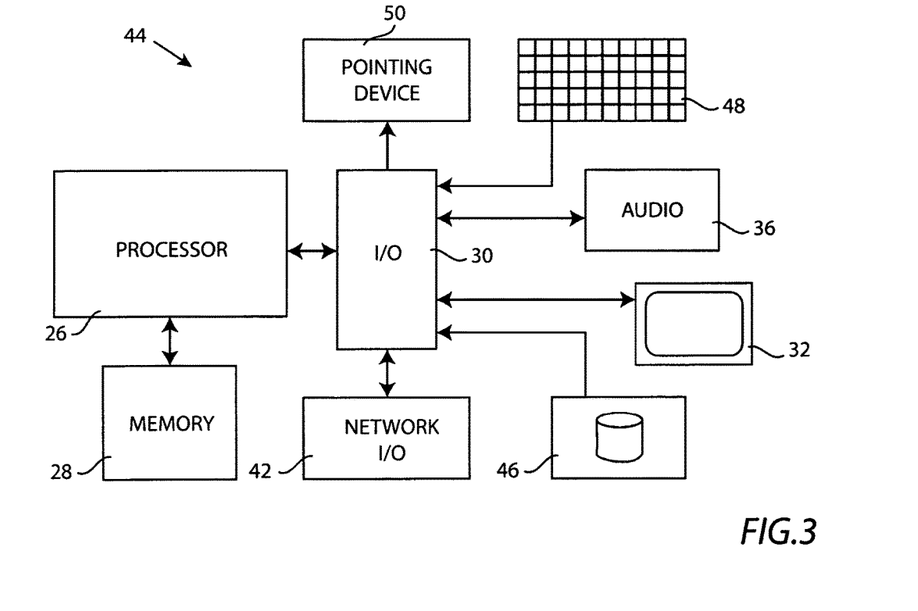
FIG. 3 is a block diagram illustrating an example client device, computer, and/or server suitable for use with features described herein.

FIG. 3 is a block diagram illustrating an example computer system 44 suitable for use with features described herein. For example, some or all of the components of the computer system 44 may be used as a server, such as the ad server 18, publisher content server 20, and survey server 21 shown in FIG. 1. Also, some or all of the components of the computer system 44 can be used, for example, to implement the client device 16. For the sake of brevity, to the extent that components of the client device 24 of FIG. 2 are analogous to components of the computer system 44 shown in FIG. 3, like numerals will be used and the detailed descriptions of the components will not be repeated.

When used as a computer, such as the client device 16, the computer system 44 includes a processor 26, memory 28, I/O 30, display 32, audio 36, and network I/O 42 as described previously in conjunction with FIG. 2. In addition, certain examples may include mass storage 46, a keyboard 48, and a pointing device 50. Mass storage 46 is often in the form of non-volatile read/write memory, such as a hard disk drive or flash memory, but also includes read-only memory, such as certain optical disc memories. The pointing device 50 may include a number of device types including a mouse, a trackball, a touch screen, a touch pad, etc. When used as a server, such as the ad server 18, publisher content server 20, or survey server 21, fewer of the components of example computer system 44 may be required.

In one example embodiment, the display 32 of the client device 12, 14, or 16 may display video streamed by the ad server 18 and/or publisher content server 20, as well as a survey delivered by the survey server 21. In other example embodiments, the video need not be streamed and can be stored, for example, as a download, in any convenient non-transitory computer-readable media. In another example embodiment, the display 32 may display a web page(s), as well as a survey delivered by the survey server 21.

In accordance with various example embodiments of the system, a survey is launched and survey results are received and analyzed to cluster users and define one or more audience proxy channels based on preferences expressed in survey results. The example embodiments in accordance with the present invention will be described by way of example, but not limitation, in respect to publisher content delivered via the Internet to a user using a web-enabled device such as a computer, a PDA, a web-enabled television, a mobile device such as a cellular telephone (e.g., a "smart-phone") or the like, hereafter referred to for convenience as a "viewer".

Figure 4:
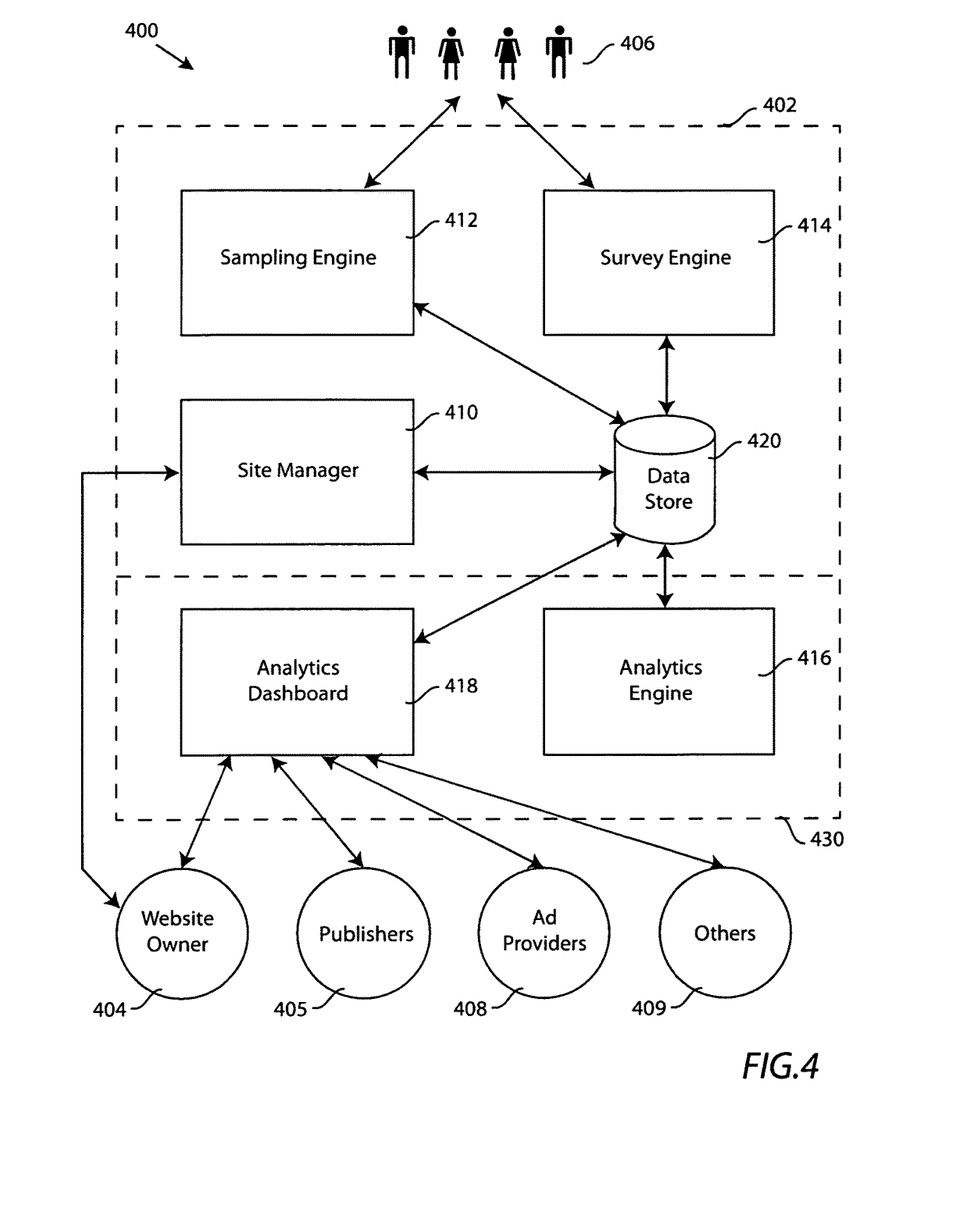
FIG. 4 is a block diagram illustrating an example embodiment of a survey environment for analyzing online survey results in accordance with an example embodiment of the system.

By way of a non-limiting example, FIG. 4 is a block diagram illustrating a survey environment 400. In the illustrated example, an online survey system 402 may be integral with or provided in combination with an audience proxy channel application program 430. The online survey system 402 comprises a site manager 410, a sampling engine 412, and a survey engine 414 interfaced to the audience proxy channel application program 430 which comprises an analytics engine 416 and an analytics dashboard 418. In one example embodiment, components 410-418 are implemented as computer program instructions comprising code segments executing on one or more processors included in one or more computers executable by the survey server 21. The components may be implemented as separate threads of the same process/program or as separate processes/programs. One or more components may be combined, and the functions of the components may be intermixed in various example embodiments. In one example embodiment, the components collectively may provide a web-based "software as a service" (SaaS) with which users of the online survey system interact, including parties, such as a website owner 404 which may be a publisher or survey consultant/informatics company, content publishers 405 of media accessed at certain websites, viewers 406 having web-enabled client devices, an advertisement provider 408, and parties 409 interested in the survey results. The online survey SaaS generates surveys, and processes, analyzes, and presents survey data.

The site manager 410 allows a website owner 404 to sign up for or provide survey service and provide information to ad buyers. In some example embodiments, the website owner 404 may provide advertisements and therefore also be the equivalent of an advertisement provider 408. In some example embodiments, the website owner 404 provides a Universal Resource Locator (URL) associated with any website accessed by a plurality of viewers 406 who are to be surveyed. The website may be a top level site or a sub-site. As will be described in greater detail below, one or more surveys are generated respecting media delivered by the publisher content server 20 to the plurality of viewers 406. The survey information is stored in a data store 420.

In one example embodiment, each of a plurality of viewers 406 is sent a survey which is spawned in conjunction with a viewer being delivered the publisher content by the publisher content server 20. In one example embodiment, the request to the sampling engine 412 may be sent at ad request time which occurs when advertising content is delivered by the ad server 18 for delivery to the viewer 406 in conjunction with delivery of the publisher content by the publisher content server 20. In some example embodiments, the website which delivers the publisher content causes the web browser of the viewer 406 to send a request to the sampling engine 412 in conjunction with the delivery of the publisher content. For example, in the case video is streamed to the client device 24 or 44, the request to the sampling engine 412 may be sent after the publisher content delivery has been completed; else, as the viewer 406 leaves the website if before the delivery is complete. In other example embodiments in which video is streamed to the client device 24 or 44, the request to the sampling engine 412 may be sent at the beginning of or during the delivery of content, for example, as a popup window or in response to the viewer 406 clicking on a survey icon using a mouse or touchpad, for example. In another example embodiment, in a case in which the publisher content is one or more web pages, the request to the sampling engine 412 to deliver the survey to the viewer 406 may occur as the viewer leaves the website or when the viewer accesses a predetermined page having the publisher content that is the subject of the survey as the viewer browses pages on the website. If the sampling engine 412 determines that an invitation to participate in the survey should be extended to a viewer 406, the viewer is provided with a visual inquiry in the form of a banner, a layer of content, a popup window, etc., to determine if the viewer is willing to participate in the survey. If the viewer 406 responds affirmatively, the survey is retrieved from the data store 420 by the survey engine 414 and delivered to the viewer in the browser on the client device 24 or 44, or the viewer may be directed to survey pages constructed by the survey engine.

The survey engine 414 causes survey questions to be displayed, collects survey results, and stores the survey results in the data store 420. The analytics engine 416 analyzes the survey results, as will described in more detail below. The analytics dashboard 418 displays the survey results visually so that they can be viewed by interested parties, such as the website owner 404 and advertisement provider 408 for learning about the survey results obtained from the viewers 406.

In general, a survey may be created and stored for delivery by a website hosted by the survey server 21. As will be described in greater detail below, in some example embodiments, the survey may be created by the website owner 404. In other examples, the survey server 21 may be a separate thread of the same process/program or a separate process/program running on the publisher content server 20, and the survey may be created by the content publisher 405. In some example embodiments, the survey server 21 may be a separate thread of the same process/program or a separate process/program running on the ad server 18, and the survey may be created by the advertisement provider 408. The survey is presented to survey participants corresponding to the plurality of viewers 406 who are willing to take the survey.

Once a survey is generated, the website owner 404, content publisher 405, or advertisement provider 408 may assign a script tag that includes a unique identifier associated to the publisher content which serves as the proxy delivered to the plurality of viewers 406 (e.g., <script src="http://static.domainname.com/start.js?id=23a878527a"></script>). The website owner 404 can then indicate via the site manager 410 that the surveying may commence. Hence, every time publisher content is delivered to a viewer through a browser or app, the script tag causes the viewer's browser or app to send a request to the sampling engine 412, which recruits viewers 406 to participate in the survey by sending the survey to the viewer using the tracking cookies associated with the browser or user id associated with the app. The system 402 repeatedly presents the survey to potential survey participants until a substantial sample of viewers 406 have participated in the survey.

Figure 5:
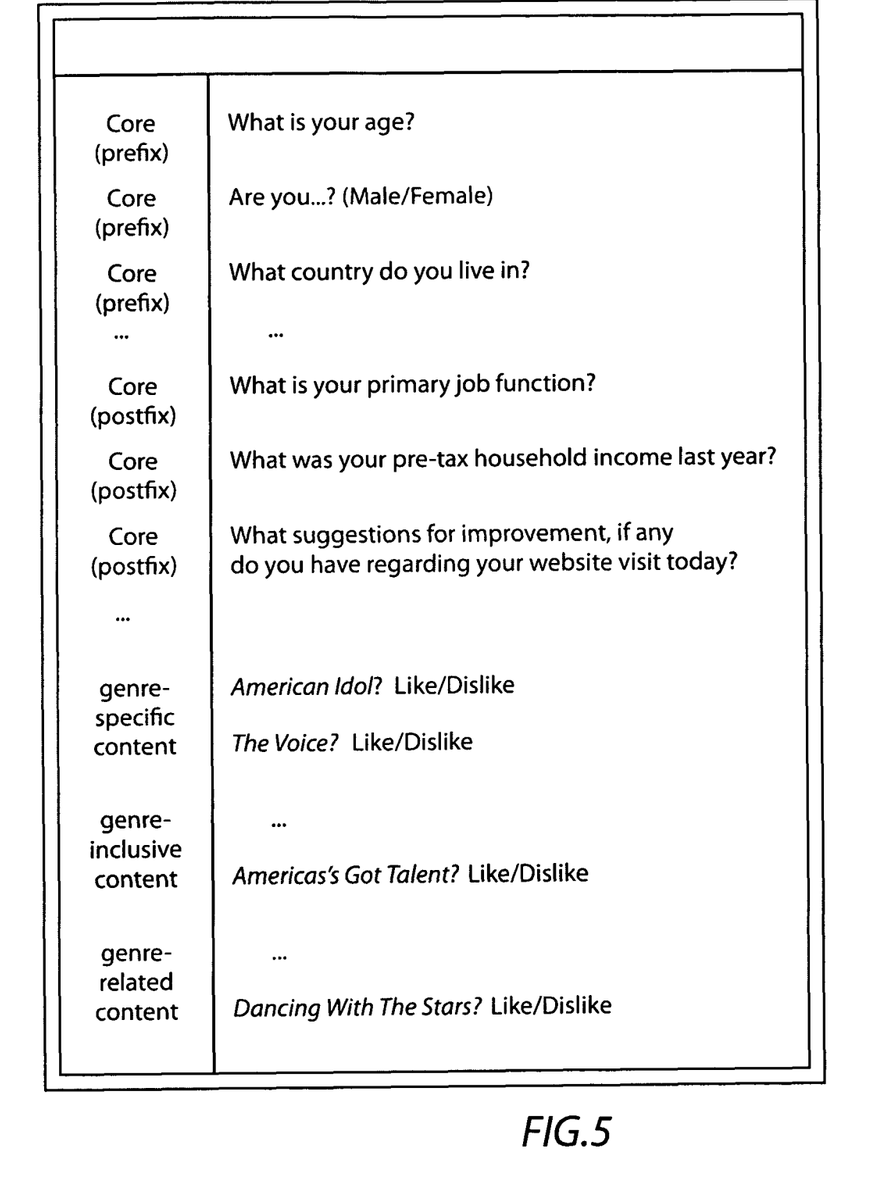
FIG. 5 illustrates examples of representative questions included in a survey created in accordance with the example embodiments.

FIG. 5 is a diagram illustrating examples of survey questions. In example embodiments, the survey questions are used to gather preferences of the viewers 406 respecting the publisher content, for example, the survey questions may include "American Idol? Like/Dislike", "The Voice? Like/Dislike", on so on for a list of television programs that are identified as being in the musical competition genre (referred to as "genre-specific content"). In some examples, the survey questions may also be expanded to elicit preferences from the viewers 406 for publisher content that may include content of the same genre (i.e., musical competition) (hereafter referred to as "genre-inclusive content"), but also includes other non-genre content such as juggling or other non-musical content but is nevertheless a competition, for example, "America's Got Talent? Like/Dislike". In some examples, the survey questions may be further expanded to elicit preferences from the viewers 406 for publisher content that may be classified in one or more categories related to genre-specific or genre-inclusive content, but includes content other than genre-specific content (hereafter referred to as "category-related content") such as dancing but is nevertheless a competition, for example, "Dancing With the Stars? Like/Dislike".

As further shown in FIG. 5, in some example embodiments, survey questions may also be used to gather demographic information about a viewer 406 (e.g., character traits that are not easily changed) and psychographic information about the viewer (e.g., other preferences, interests, and inclinations). In some example embodiments, one or more sets of default questions (for example, "core prefix" and "core postfix questions) pertaining to generic information such as the viewer's demographic and/or psychographic information may be included in the survey as well. In addition, in some example embodiments, the website owner 404, content publisher 405, and/or ad provider 408 may have the option to provide certain custom questions to be included in the survey.

Figure 6:
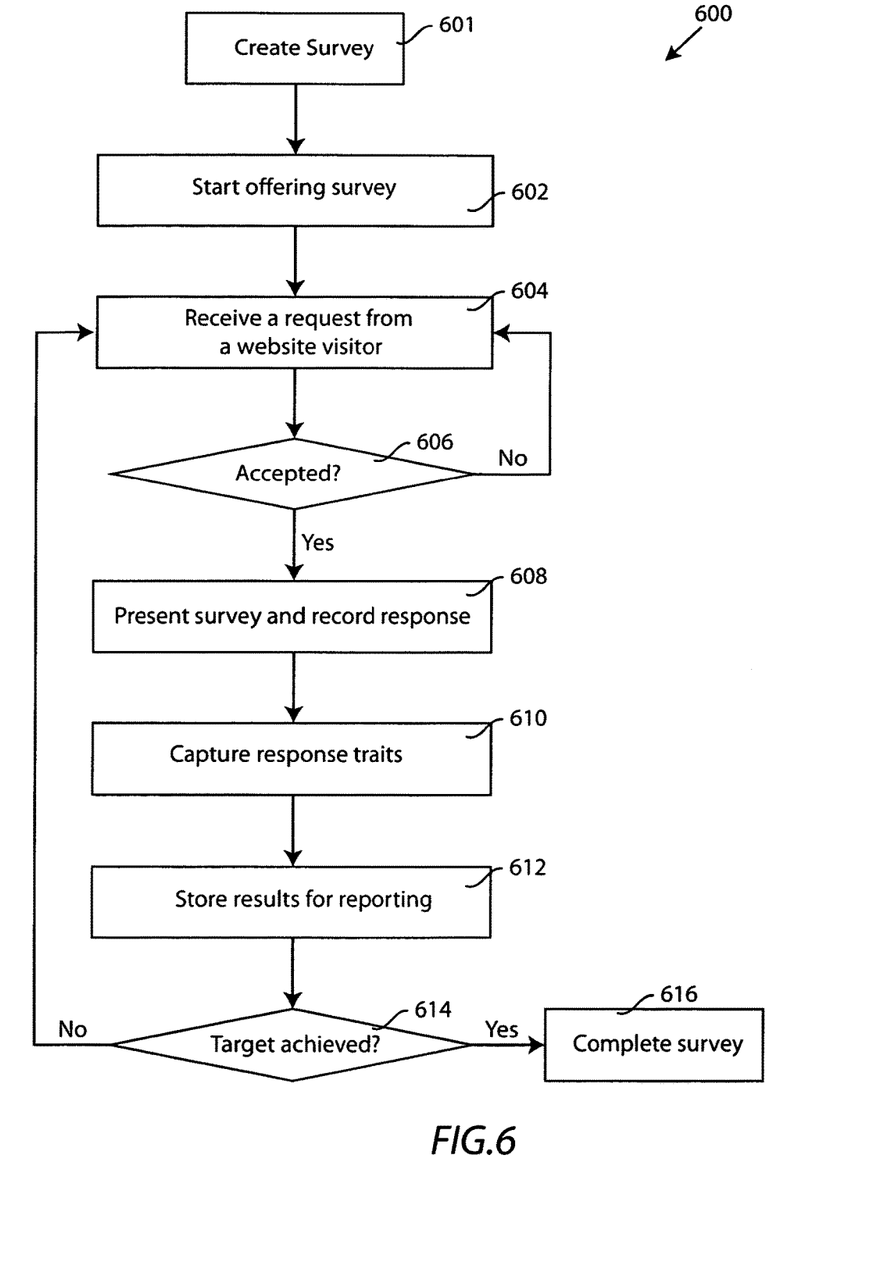
FIG. 6 is a flow diagram illustrating an example process for conducting a survey.

FIG. 6 is a flow diagram illustrating an example of a process for conducting the survey. Process 600 may be performed on a system such as 400. In this example, process 600 starts at 601 with creation of a survey, as described above. At 602, the website initiates the survey.

At 604, a request from a viewer 406 is received. As described previously, in some example embodiments the website owner 404, content publisher 405, or advertisement provider 408 embeds a script tag into the content that is delivered or on the web page that is accessed by the viewer 406. Consequently, when a viewer's browser loads content or a page at the website, a request is sent to the online survey system 400.

In one example embodiment, a survey offer may be extended to the viewer 406, and it is determined at 606 whether the survey offer is accepted by the viewer. If the viewer 406 does not accept the survey offer, control returns to 604 to wait for another survey request. If the viewer 406 accepts, the survey questions are presented to the viewer in the viewer's browser or through the viewer's app in an appropriate sequencing order, and responses to the survey questions are recorded at 608. In another example embodiment, the request to the sampling engine 412 may be sent at ad request time which occurs when advertising content is delivered by the ad server 18 for delivery to the viewer 406 in conjunction with delivery of the publisher content by the publisher content server 20, and the survey is presented to the viewer at that time.

Optionally, additional response traits may be captured at 610. As used herein, response traits refer to characteristics associated with the survey respondent other than the responses to the survey response context. Examples of response traits include time of survey, browser type, language used by the browser, page context information such as the URL from which the viewer is referred, keywords in the referring URL, operating system, screen size, network location, geographic location, etc.

At 612, the survey results (including survey responses and response traits) are stored in the data store 420. At 614, it may be determined if a target sample of at least a predetermined number of viewers 460 has participated in the survey. If so, process 600 completes at 616; else, control returns to 604 to wait for another request from a viewer 406 until the predetermined number of viewers has completed the survey to achieve the target sample.

Once a substantial number of viewers 406 have completed the survey, the accumulated survey results can be presented for the population sampled. The survey results can also be broken down and analyzed in numerous ways. For example, the analytics dashboard 418 can present to the website owner 404, content publisher 405, ad provider 408, and/or others 409 a breakdown of survey responses by the viewers 406 to the genre-specific content questions, as well as the genre-inclusive and/or category-related content questions, if any. In some example embodiments, profiles of viewers 406 who participated in the survey may be created based on answers to the survey questions, such as a breakdown of gender, age, race, occupation, income, geographic location, purchasing habits, purchasing intentions, or other survey responses. Furthermore, the analytics dashboard 418 can present survey information breakdowns based on response traits, such as time, page context, browser type, operating system, geographic location, or referring site, such as a blog or search engine or other directory.

As previously described, a television advertising campaign may target an audience attracted to several television programs based on the paradigm of advertising placement using publisher content as a proxy to reach the targeted audience of viewers. Consequently, extra effort on the part of the advertiser is required when, for example, the television programs of interest to the advertiser are on television channels which are separately owned and operated.

Launching an advertising campaign over the Internet based on the paradigm using publisher content as a proxy to reach the targeted audience of viewers encounters the same problem. In contrast to the prior art, example embodiments to now be use survey data to identify one or more audience-based proxy channels by clustering viewers according to their likes and dislikes of publisher content.

Figure 7:
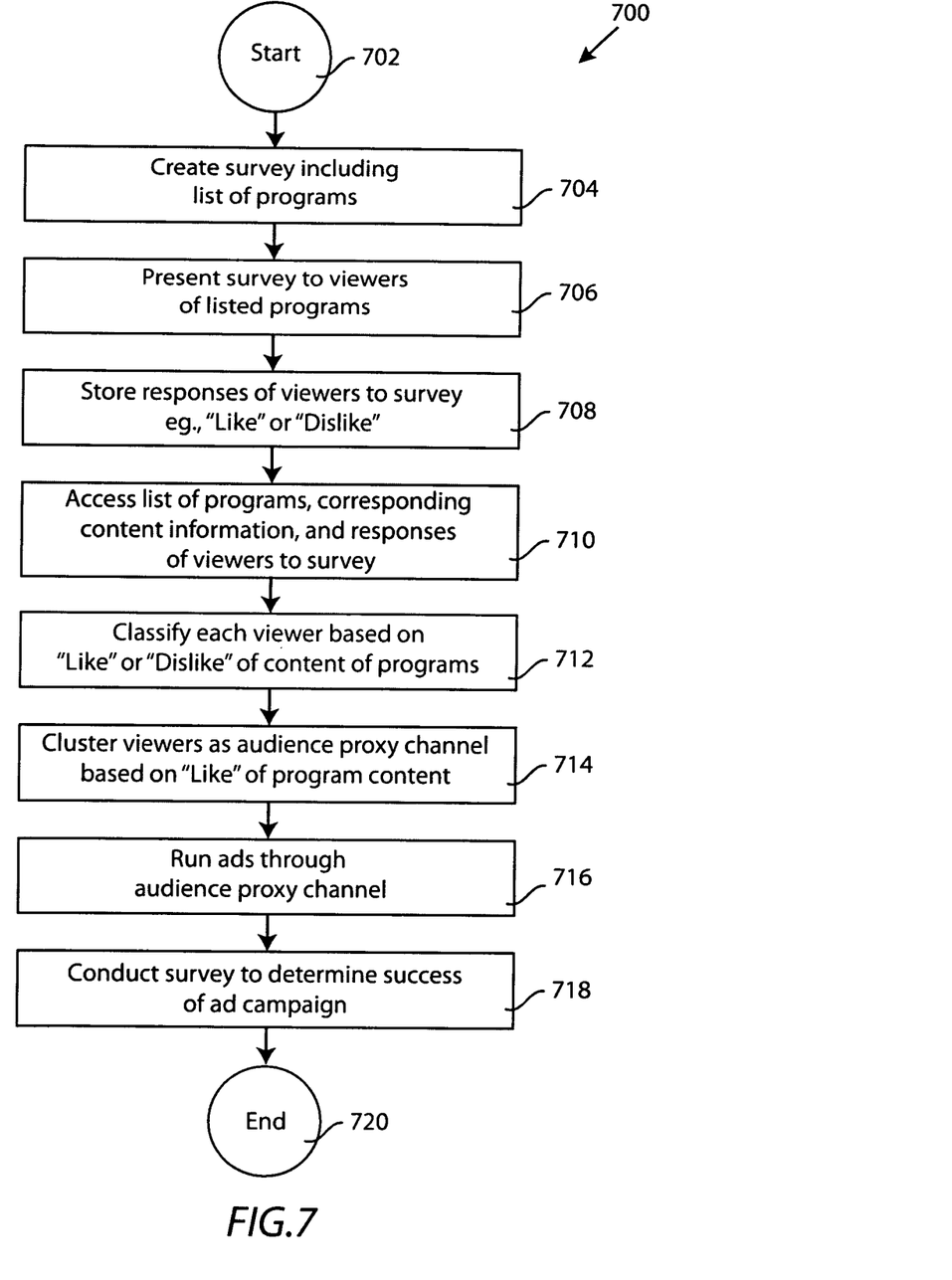
FIG. 7 is a flow diagram illustrating an example process for providing content-specific viewer aggregation to create an audience proxy channel.

In an example embodiment of a method 700 shown in FIG. 7, beginning at 702, a survey is created at 704, which includes a list populated with, for example, 20 television programs that consist of genre-specific content or a combination of genre-specific content, genre-inclusive content, and/or category-related content. Then, at 706, in one example embodiment, at an ad request time to the ad server 18 by the content publisher server 20 streaming one of the 20 listed television programs, the viewers 406 are presented the survey. By way of non-limiting example, the survey may ask whether the participating viewers "Like" or "Dislike" the television program in the list being viewed and the other television programs in the list. At 708, the viewers 406 who participate in the survey respond with answers (i.e., "Like" or "Dislike") which are stored for analysis. For example, the survey results including the "Like" and "Dislike" responses from the viewers 406 may be stored in the data store 420. At 710, the survey results are retrieved and analyzed to determine which television programs the responding viewers 406 liked and disliked. For example, the analytics engine 416 accesses the data store 420 and fetches the list of television programs and related content information (i.e., genre-specific, genre-inclusive, or category-related) and the associated "Like" and "Dislike" responses from the viewers 460. At 712, each viewer who responded to the survey is classified according to his or her "Like" or "Dislike" of the television programs listed in the survey.

For example, if a viewer 406 responds "Like" to "American Idol?" and "Like" to "The Voice?", that viewer is classified as a member of the viewing audience who is interested in musical competitions. In other words, through the survey, that viewer and all other viewers 406 with the same response to those survey questions are classified as members of the viewing audience who "Like" musical competitions.

Considered in more detail, in one example implementation, the analytics engine 416 accesses the survey data to build an offline classifier and copies the logic to a cache. That is, using survey sampling to measure audience television program affinities, the analytics engine 416 builds a classifier for classification of viewers 406 based on their responses to the survey. The classifier is a function of certain inputs (also referred to as signals, factors, independent variables, regressors, or the like), with the output being the resulting classification (e.g., television program(s) liked). In some example embodiments, viewers 406 may be classified using signals to achieve viewer segmentation and audience targeting.

At 714, the viewers 406 who can be classified as members of the viewing audience who "Like" musical competitions are collectively clustered as a proxy channel for an audience to target based on interest in musical competitions. In some example embodiments, if the viewers 406 of another television program responded as liking television programs common to the other survey, then the survey responses from the viewers of that other television program can be used a proxy for the same publisher content until more tracking cookies or user ids are obtained to increase the samples to establish an audience proxy channel. At 716, the advertiser can then run the advertising campaign through that audience proxy channel and target that channel as opposed to targeting content. For example, if the advertiser wants to target an audience which is interested in musical competitions, the audience proxy channel enables the advertiser to target that audience. At 718, a survey can be conducted to determine the success of the advertising campaign. At 720, method 700 ends.

The method 700 quickly and economically identifies an audience for the advertiser to target at scale online by establishing a proxy channel for an audience using classification of the viewers 406, rather than using content as a proxy. Such audience proxy channels enable an advertiser to target viewers 406 classified into the audience proxy channel, who are of direct interest to the advertiser. For example, the advertiser can be approached on the basis that there is an audience proxy channel available to the advertising campaign, especially if it is known that the potential advertiser has a strong association with a television program having publisher content of interest to an established audience proxy channel.

Consequently, at ad request time, when serving an ad from the television advertising campaign, the current viewer 406 is classified. In some example embodiments, if he or she is classified as liking one of the 20 listed television shows, the ad server 18 serves the television advertising campaign ad. Otherwise, in some example embodiments, the ad server 18 may serve some other ad or no ad at all if the classification of the current viewer is not based on a strong signal.

Additionally, in example embodiments, at 714, the analytics engine 416 may use contextual targeting via survey sampling to establish one or more audience proxy channels. The analytics engine 416 analyzes the survey results for the viewers 406 responding to the survey and associates publisher content with measures of liking and disliking television programs included in the survey by the responding viewers. The classification of the viewers 406 is then extended by the analytics engine 416 to all publisher websites which the viewers have visited (or subsequently visit) using look-alike modeling.

If several viewers 406 are surveyed on the same content publisher website, and the analytics engine 416 determines that the survey results are consistent in responding viewers "liking"/"disliking" certain television programs, the confidence score increases respecting those common publisher websites. On the other hand, if the analytics engine 416 determines that the responses of the several viewers 406 are inconsistent, a relatively lower/higher score is associated to "liking" or lower/higher score is associated to "disliking" depending on the values, for example, relative to a pair of normalized values, such as "Like" and "Dislike".

Figure 8:
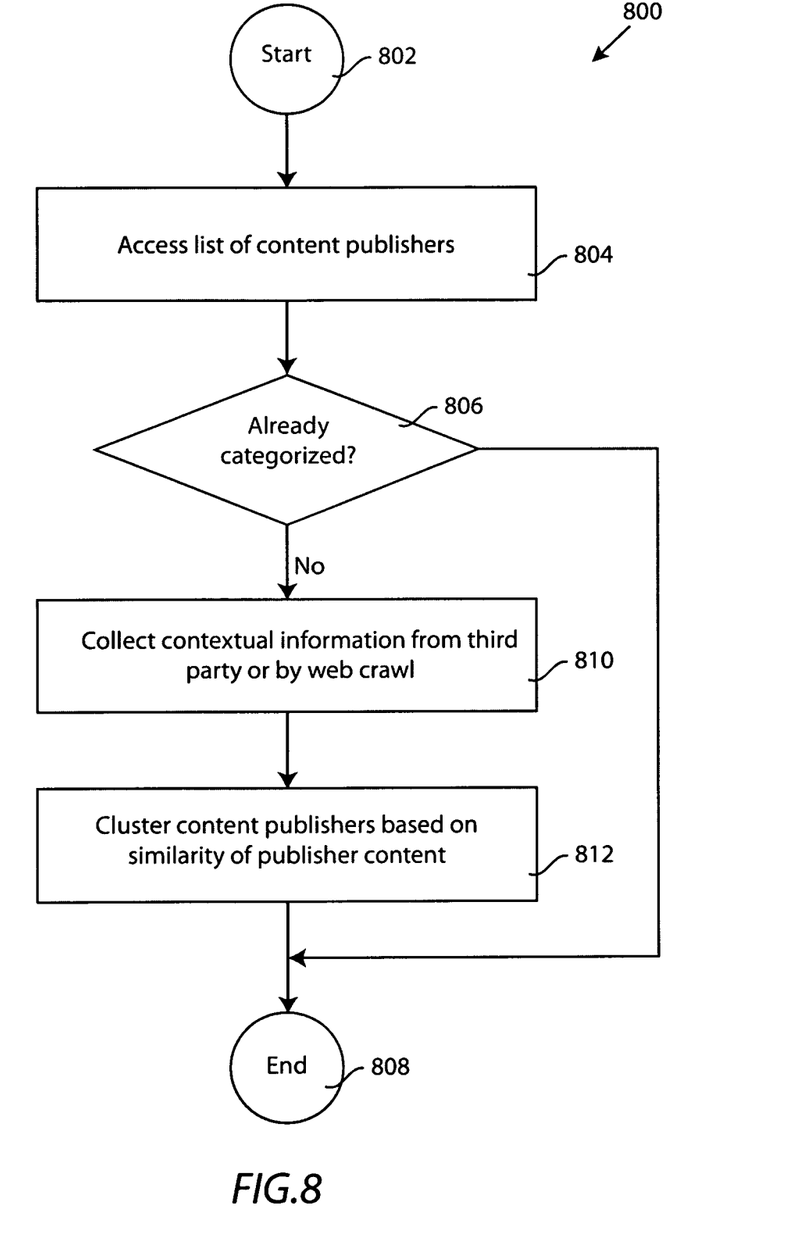
FIG. 8 is a flow diagram illustrating an example process for categorizing publisher websites.

In an alternative example embodiment to the above described example embodiments in which viewers 406 are presented with surveys and are classified using survey data, a method 800 is shown in FIG. 8 to categorize publisher websites. The better (and finer) the categorization is, the better targeting will be. Categorization of publisher websites enables publisher content to be used as a proxy for the viewers 406 to establish audience proxy channels.

Beginning at 802, a list of content publishers is obtained at 804. For example, a list of content publishers is available from comScore. At 806, a determination is made whether or not the publisher website is already categorized. For example, ad networks may categorize content publishers according to the IAB classification (~20 top-level categories and ~500 subcategories) or other classification scheme. If the publisher website is already categorized, the method ends at 808. However, not all publisher websites are currently categorized. If the publisher website is not categorized, contextual information about publisher website content is collected at 810. For example, the contextual information collected may be obtained from a third party or by a web vertical crawler, as will now be described in further detail.

By way of example, given the list of content publishers (e.g., from comScore) and using contextual targeting via web-crawling and scraping information from publisher websites and parsing the information, an index may be built. The web-crawling may be more or less granular to add signals, including all terms that describe the television program, and also to have stronger signals between the viewers 406 and content publishers. Based on the index and the content of the television programs and audience, an association may be made at ad serving time.

Figure 9:
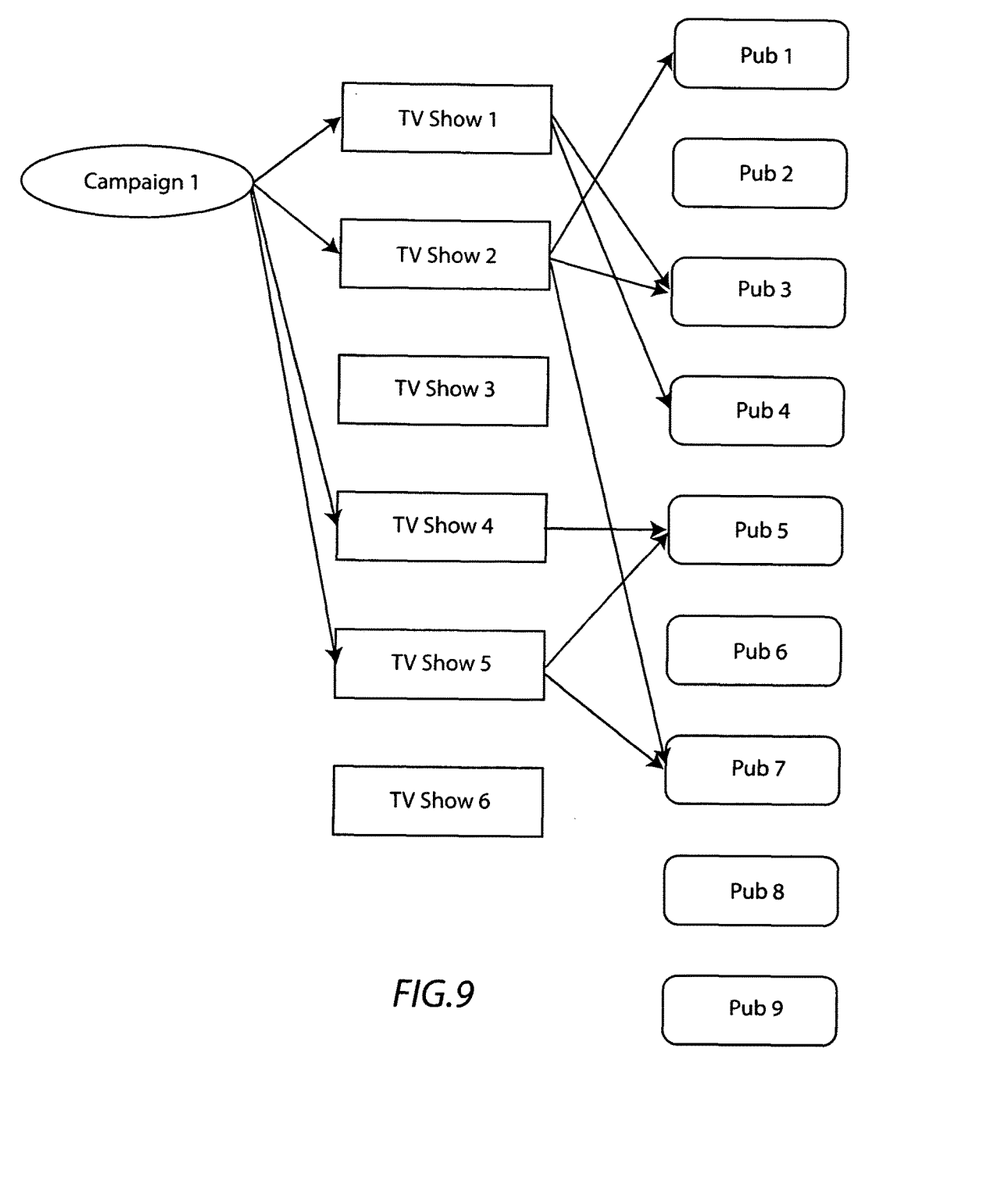
FIG. 9 illustrates clustering of content provider websites.

At 812, publisher websites may be clustered with a distance metric based on similar television programs, as shown in FIG. 9. Clustering of publisher websites by associating similar content at the publisher websites, is important, e.g., for audience amplification in establishing audience proxy channels. The method 800 ends at 808.

If, at ad serving time, the current viewer is associated with one of the television programs (with a large enough association score), then one of the advertiser's ads is targeted to the television program. There may be several television programs associated with the advertiser.

In another example embodiment, a combination of third party data and survey sampling may be used to associate television programs to advertisers. This association is used at ad serving time (link from advertiser to campaigns to television programs or link from advertiser to television programs to campaigns).

Although various example embodiments have been described using specific terms and devices, such description is for illustrative purposes only. The words used are words of description rather than of limitation. It is to be understood that changes and variations may be made by persons of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A system to cluster viewers of video programs delivered to the viewers over a network to establish a viewing audience proxy channel based on survey responses of the viewers comprising:

a server including a processor;

a network connection coupled to the processor; and non-volatile memory coupled to the processor containing program instructions comprising:

code segments detecting a request from a script tag embedded in a web page displaying a streaming video program by a website owner, wherein the script tag includes an URL of the web page and a unique identifier associated with a content of the web page;

code segments to recruit a viewer of the web page after detecting the request from the script tag embedded in the web page by the website owner by sending a survey to the viewer using tracking cookies associated with a browser of the viewer displaying the web page including one or more questions to elicit preferences of the viewer as to specific content of the streaming video program;

code segments for receiving the responses to the survey questions;

code segments for aggregating preferences of viewers as to specific content of video programs based on responses to the one or more survey questions; and code segments for clustering viewers based on their responses as to specific content of video programs to aggregate the clustered viewers as one or more viewing audience proxy channels based on their surveyed preferences as to specific content of video programs, wherein each audience proxy channel associates the clustered viewers as an audience of interest targeted through content-specific video programs, such that the content is a proxy to reach that audience of interest, and each video program is a content-specific proxy channel to target a segment of surveyed viewers based on the specific content.

2. A system as recited in claim 1 wherein the survey asks the viewers to respond with preferences respecting genre-specific content of one or more television programs.

3. A system as recited in claim 1 wherein the survey asks the viewers to respond with preferences respecting genre-inclusive content of one or more television programs.

4. A system as recited in claim 1 wherein the survey asks the viewers to respond with preferences respecting category-specific content of one or more television programs.

5. A non-transitory computer-readable storage medium to cluster viewers of media based on their responses to survey questions to aggregate the clustered viewers as one or more viewing audience proxy channels based on their surveyed preferences, the non-transitory computer-readable storage medium including instructions executable by a computer system comprising one or more processors, the instructions comprising:
   a sampling engine including instructions comprising code segments executable by the computer system to detect a request from a script tag embedded in at least one of a web page displaying a streaming media by a website owner, wherein the script tag includes an URL of the web page and a unique identifier associated with a content of the webpage, and to recruit viewers to conduct a survey, after detecting the embedded script tag, by sending the survey to the viewers using tracking cookies associated with browsers of the viewers, the survey including one or more questions provided to a plurality of viewers of a streaming media accessible by the plurality of viewers comprising questions to elicit preferences of the plurality of viewers as to specific content of the media viewed by said plurality of viewers;
   a survey engine including instructions comprising code segments executable by the computer system to receive survey data including responses by viewers responding to the survey;
   a data store including instructions comprising code segments executable by the computer system to store the survey response data in a data store comprising a non-transitory computer-readable storage medium; and
   an analytics engine including instructions comprising code segments executable by the computer system after the survey is completed to analyze the survey response data to determine preferences of the viewers as to specific content of the media from the survey response data and to analyze the preferences among responding viewers as to specific content of the media to cluster viewers based on their responses to aggregate the clustered viewers as one or more viewing audience proxy channels based on their surveyed preferences as to specific content of the media, wherein each audience proxy channel associates the clustered viewers as an audience of interest targeted through content-specific media, such that the specific content is a proxy to reach that audience of interest, and the content-specific media determines a content-specific proxy channel to target a segment of surveyed viewers based on the specific content.

6. A non-transitory computer-readable storage medium as recited in claim 5 wherein the analytics engine further comprises code segments for offline classification of viewers based on their responses to the survey.

7. A non-transitory computer-readable storage medium as recited in claim 6 wherein the classification comprises association of the viewers with one or more television programs liked by the classified viewers.

8. A non-transitory computer-readable storage medium as recited in claim 7 wherein viewers are classified using signals to achieve viewer segmentation.

9. A non-transitory computer-readable storage medium as recited in claim 7 wherein viewers are classified using signals to achieve audience targeting.

10. A non-transitory computer-readable storage medium as recited in claim 7 wherein viewers classified as members of a viewing audience are collectively clustered as a proxy channel for an audience to target based on an affinity for genre-specific content.

11. A non-transitory computer-readable storage medium as recited in claim 7 wherein viewers classified as members of a viewing audience are collectively clustered as a proxy channel for an audience to target based on an affinity for genre-inclusive content.

12. A non-transitory computer-readable storage medium as recited in claim 7 wherein viewers classified as members of a viewing audience are collectively clustered as a proxy channel for an audience to target based on an affinity for category-related content.

13. A non-transitory computer-readable storage medium as recited in claim 5 wherein a second survey is conducted to determine success of an advertising campaign.

14. A non-transitory computer-readable storage medium as recited in claim 5 further comprising an ad server to serve ads to the viewers wherein at ad request time, an ad is served based on classification of the viewer.

15. A non-transitory computer-readable storage medium as recited in claim 6 wherein the classification of the viewers is extended by the analytics engine to at least one other website using look-alike modeling.

16. A method for clustering of viewers of video programs based on their responses to survey questions to aggregate the clustered viewers as one or more viewing audience proxy channels based on their surveyed preferences comprising:
   providing embedded script tags for a plurality of web pages displaying a plurality of streaming video programs to a plurality of website owners to embed in web pages of the plurality of website owners, wherein each script tag includes a URL of a web page and a unique identifier selected by the website owner associated with a content of the web page;
   recruiting viewers by sending a survey, upon an activation of an embedded script tag to send a request using tracking cookies associated with viewer browsers, the survey including one or more questions provided to the plurality of viewers of video programs accessible by the plurality of viewers comprising questions to elicit preferences of the plurality of viewers as to specific content of video programs viewed by said plurality of viewers;
   receiving survey data including responses by viewers responding to the survey;
   storing the survey response data in a computer-readable storage medium; and
   analyzing the survey response data to determine preferences of the viewers as to specific content of video programs from the survey response data and to analyze the preferences among responding viewers as to specific content of video programs to cluster viewers based on their responses to aggregate the clustered viewers as one or more viewing audience proxy channels based on their surveyed preferences as to specific content of video programs, wherein each audience proxy channel associates the clustered viewers as an audience of interest targeted through content-specific video programs, such that the specific content is a proxy to reach that audience of interest, and each video program is a content-specific proxy channel to target a segment of surveyed viewers based on the specific content.

17. A method as recited in claim 16 wherein the survey asks the viewers to respond with preferences respecting at least one of genre-specific content, genre-inclusive content, and category-specific content of one or more television programs.

18. A method as recited in claim 16 wherein a second survey is conducted to determine the success of an advertising campaign.

19. A method as recited in claim 16 further comprising serving ads to the viewers wherein at ad request time, an ad is served based on classification of the viewers.

20. A system as recited in claim 16 wherein viewers are classified using signals to achieve at least one of viewer segmentation and audience targeting.

* * * * *